United States Patent [19]

Morris

[11] Patent Number: 4,466,462
[45] Date of Patent: Aug. 21, 1984

[54] CIRCUITOUS PATH FLOW RESTRICTOR

[75] Inventor: Hugh C. Morris, East Peoria, Ill.

[73] Assignee: Caterpillar Tractor Co., Peoria, Ill.

[21] Appl. No.: 546,080

[22] PCT Filed: Feb. 1, 1982

[86] PCT No.: PCT/US82/00132
§ 371 Date: Feb. 1, 1982
§ 102(e) Date: Feb. 1, 1982

[87] PCT Pub. No.: WO83/02647
PCT Pub. Date: Aug. 4, 1983

Related U.S. Application Data

[63] Continuation of Ser. No. 361,696, Feb. 1, 1982, abandoned.

[51] Int. Cl.³ .............................................. F15D 1/04
[52] U.S. Cl. ......................................... 138/42; 138/40
[58] Field of Search ................ 138/37, 38, 39, 40, 138/42; 123/228; 137/625.28, 625.3; 251/127

[56] References Cited

U.S. PATENT DOCUMENTS 3,323,550  6/1967  Lee ........................................ 138/39
3,397,794  8/1968  Toth et al. ........................... 210/488
3,987,809 10/1976  Baumann ............................... 138/42
4,004,613  1/1977  Purton et al. ....................... 138/42 X

FOREIGN PATENT DOCUMENTS 55970 12/1935  Norway ................................. 138/42
987402  3/1965  United Kingdom .................. 138/42

OTHER PUBLICATIONS

Lee Company of Westbrook, Connecticut, Flow Restrictor Booklet, pp. 1 & 143, Circa 1981, and Sketch Identified as "Exhibit A".

Primary Examiner—James E. Bryant, III
Attorney, Agent, or Firm—Charles E. Lanchantin, Jr.

[57] ABSTRACT

A circuitous path flow restrictor (10) having no moving parts includes a fluid director member (16) having a core (24) and a plurality of fins (26) extending from the core and defining alternately axially offset notches (50,52). The fluid director member is encircled by a containment member (54) such that a serpentine fluid flow path (58) is defined therebetween to provide a fluid flow resistance level equivalent to a simple orifice of much smaller diameter. The fluid director member can be made by a precision casting process for economy of manufacture.

12 Claims, 3 Drawing Figures

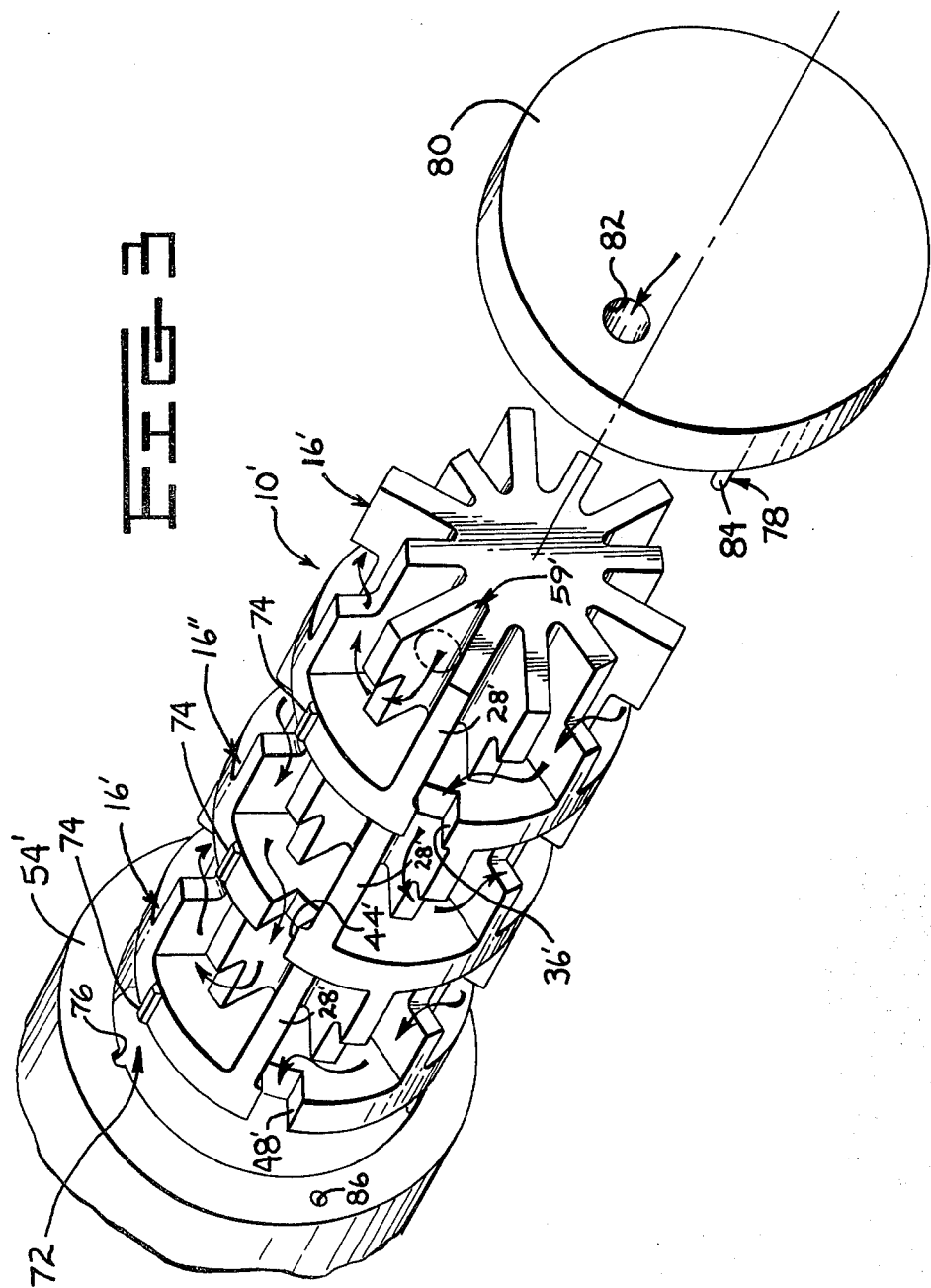

CIRCUITOUS PATH FLOW RESTRICTOR

This is a continuation of Ser. No. 361,696, filed Feb. 1, 1982, now abandoned.

DESCRIPTION

TECHNICAL FIELD

This invention relates generally to a flow restrictor, and more particularly to a circuitous path flow restrictor of simple construction.

BACKGROUND ART

Flow restrictors having no moving parts are known for incorporation in the conduits or passageways of transmission control systems. These flow restrictors provide an accurately metered and substantially constant fluid flow rate under given pressure conditions and are particularly useful for controlling the rate of pressure rise to the annular pistons associated with the clutches and/or brakes of present day transmissions.

The Lee Company of Westbrook, Connecticut offers a series of cascade restrictors of generally cylindrical disc-like shape having single ingress and egress passages and a tortuous internal path for the fluid. The minimum passage size in the fluid path of such restrictors is relatively large, for example about the equivalent of a cylindrical opening having a diameter of 1.52 mm (0.060"), and yet the restrictor acts as if it had a fluid flow resistance level equivalent to a simple orifice of much smaller diameter, for example about 0.51 mm (0.020"). The major advantage is that a simple orifice of very small diameter might be plugged by a single grain of sand, so that it is undesirable to use very small diameter orifices in the transmissions of vehicles. These cascade restrictors are modularized so that one, two, three or even more individual units can be placed together in a cylindrical stack to provide the equivalent resistance to progressively smaller simple orifices.

The major problem with presently available flow restrictors is that they are constructed and manufactured in such a way that they are too expensive. Specifically, at least some cascade restrictors are currently constructed by initially removing material from thin steel sheet material or shim stock. The individual layers are then stacked up forming a series of small cylindrical discs with the material removed from the sheet material forming the internal tortuous path. End plates with ingress and egress passages are added to the stack to form a single modular unit or stage and the individual sheet material layers are collectively secured together such as by welding or the like. This is wasteful and time consuming.

Another fluid flow restrictor assigned to The Lee Company is disclosed in U.S. Pat. No. 3,323,550 issued to L. Lee II on June 6, 1967. However, relatively expensive machining methods are again utilized in that construction.

The present invention is directed to overcoming one or more of the problems as set forth above.

DISCLOSURE OF THE INVENTION

In one aspect of the present invention a flow restrictor is provided having fluid director means defining a core, a plurality of longitudinally oriented fins extending from the core and defining alternately axially offset notches, and a longitudinally oriented blocking fin extending from the core. Body means is also provided which encircles the fluid director means and defines an ingress passage, an egress passage, and a serpentine flow path so that fluid can enter the ingress passage adjacent the blocking fin, travel peripherally about the core in the serpentine flow path via the notches, and exit the egress passage adjacent the opposite side of the blocking fin in a single fluid flow path.

Preferably, I contemplate making a fluid director member with a plurality of notched fins by an investment casting process in such a way that it has two or more serially arranged serpentine fluid flow paths. Selective stages of the fluid director member may be cut off or separated from the remainder to provide a fluid flow resistance level equivalent to a cylindrical orifice of a preselected smaller diameter. Thus, the fluid director member is simple to produce and can be slipped or press-fitted into a cylindrical bore to make a circuitous path flow restrictor of particularly economical and adaptable construction.

BRIEF DESCRIPTION OF THE DRAWINGS

FIG. 3 is a diagrammatic and enlarged exploded isometric view of another embodiment of the circuitous path flow restrictor of the present invention.

BEST MODE FOR CARRYING OUT THE INVENTION

Figure 1:
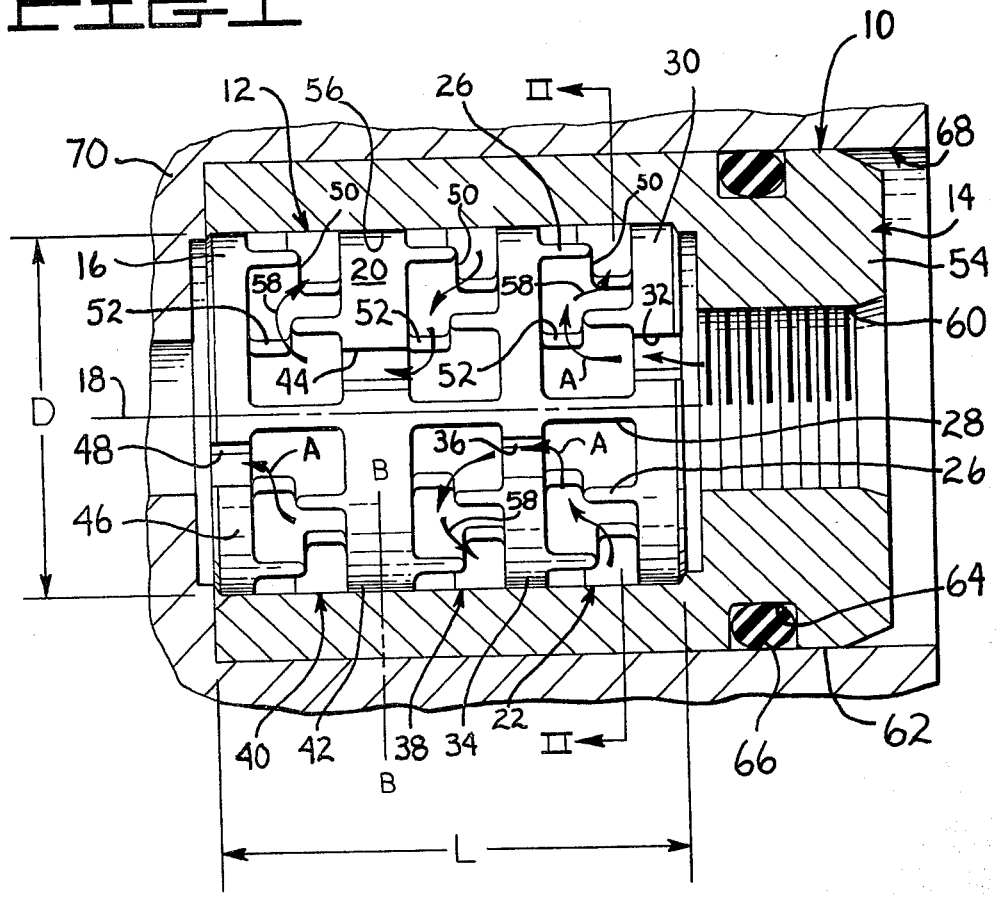
FIG. 1 is a diagrammatic and enlarged elevational view of one embodiment of the circuitous path flow restrictor of the present invention, with a portion thereof illustrated in cross section to better disclose the details thereof.

Referring to FIG. 1, a circuitous path flow restrictor 10 is shown as having two major parts—namely a fluid director means 12 and an encircling body means 14. In the instant example the fluid director means consists of a three stage fluid director member 16 coaxially disposed on a central axis 18 and having an interrupted or contoured cylindrical external surface 20 of a preselected diameter "D" as indicated on the drawing. In practice the diameter "D" can be about 12.7 mm (0.50") and the length "L" about 15.5 mm (0.61").

Figure 2:
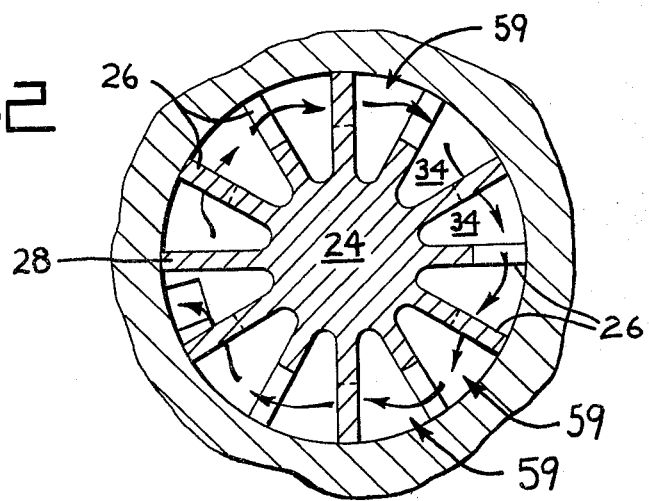
FIG. 2 is a cross-sectional view of the flow director member illustrated in FIG. 1 as taken along line II—II thereof.

The first stage 22 of the fluid director member 16, located at the right end thereof when viewing FIG. 1, has a cross section illustrated in FIG. 2. The cross section illustrates a central core 24, a plurality of longitudinally oriented notched fins 26 extending radially from the core, and a single longitudinally oriented blocking fin 28 extending radially from the core. An inlet end wall 30 is integrally formed in contiguous relation with the core and the fins, and is provided with an ingress notch or ingress passage 32 which opens radially outwardly on the cylindrical external surface 20 of the end wall. An inner wall 34 is integrally formed on the other end of the core and fins and defines an egress notch or passage 36 from the first stage of the fluid director means 12.

As best shown in FIG. 1, the fluid director member 16 has a second stage 38 and a third stage 40 of similar construction to the first stage in that they each have a central core, a plurality of notched fins and a blocking fin like the elements 24, 26 and 28 of FIG. 2. However, the second and third stages share a common inner wall 42 which is twice as thick as the common inner wall 34 between the first and second stages, the purpose of which will be later explained, and a second egress notch 44 is defined in the wall 42. Egress notch 44 from the second stage is radially and axially aligned with the ingress notch 32 but is angularly offset from the egress notch 36 from the first stage. An outlet end wall 46 likewise defines a third egress notch 48 from the third stage which is radially and axially aligned with the first egress notch 36.

Referring to FIG. 1, the notched fins 26 can be seen to advantageously define alternately offset first notches 50 and second notches 52. In other words, each of the stages 22, 38 and 40 has a plurality of the notched fins 26 with the radially outwardly opening notches 50 being located forwardly in radial alignment and with the notches 52 similarly located rearwardly in radial alignment. Moreover, the first notches 50 of the first stage are axially aligned with the first notches of the subsequent stages, as are the second notches 52 aligned in rows.

The body means 14 includes a cylindrical containment member 54 defining a cylindrical bore or chamber 56 for closely encircling the fluid director means 12 and defining therewith a three stage serpentine fluid flow path 58 as indicated by the flow arrows identified by the letter A. As best shown in Fig. 2, each stage of the serpentine fluid flow path is made up of a plurality of interconnected wedge or pie-shaped chambers 59 in an annular array which are of substantially equal volume since the fins 26 and 28 are preferably uniformly spaced about the cores of the individual stages. In FIG. 2, for example, the adjacent fins form a common included angle of about 30°. One of the notches 50 or 52 serves as the inlet path to one of the pie-shaped chambers 59 while the other serves as the outlet path.

The containment member 54 has a threaded bore 60 and a cylindrical external surface 62 interrupted by an O-ring groove 64. An O-ring seal 66 is disposed in the groove so that when the containment member and fluid director member 16 are inserted as a unit into a stepped bore 68 of a housing 70 of an associated transmission control system or the like, fluid is forced to travel solely through the flow restrictor 10. A threaded fastener, not shown, can be inserted into the threaded bore 60 to permit convenient removal of the containment member and fluid director member from the housing.

Referring next to FIG. 3, another embodiment of the circuitous path flow restrictor 10' is seen to include separate end fluid director members 16' and a centrally located fluid director member 16". In this regard elements similar to those described with respect to FIGS. 1 and 2 bear the same reference numbers, but with at least one prime indicator appended thereto. The only structural difference between the director members 16' and 16" is that the end director members have their respective egress notches 36' and 48' angularly disposed on one side of the blocking fins 28' and the central fluid director member has its egress notch 44' on the other side. The individual members 16' and 16" can be properly inserted into the containment member 54' utilizing a first alignment means 72. In the instant example the first alignment means includes an upstanding rib 74 formed at the proper angular position on the periphery of each of the members 16' and 16", and includes a corresponding groove 76 to receive the ribs in the containment member. A second alignment means 78 is used to properly orient an end cover or cap 80 on the containment member in order to align an ingress passage 82 formed therein with the first one of the pie-shaped chambers 59'. As can be noted, the second alignment means includes a dowel 84 secured to the cover and a corresponding cylindrical opening 86 formed in the end of the containment member.

INDUSTRIAL APPLICABILITY

As can be appreciated from viewing FIG. 1, the circuitous path flow restrictor 10 has a relatively large plurality of the notches 50, 52 controlling the flow between the corresponding number of pie-shaped chambers 59. When the fluid enters the fluid director means 12 via the threaded bore 60 and the ingress notch 32 adjacent the blocking fin 28 it circulates within the first one of the chambers 59 and exits by way of the axially rearwardly located notch 52. It thereafter circulates in the second of the pie-shaped chambers and exits by way of the axially forwardly located notch 50. Thus the fluid is caused to weave alternately rearwardly and forwardly by the displaced notches almost all the way around the periphery of the first stage until it is blocked by the opposite side of the blocking fin 28 and caused to flow out the first egress notch 36.

Each of the notches 50, 52 and the ingress and egress notches 32, 36 has preferably the same equivalent cross-sectional area and resistance to fluid flow. I theorize that if these notches are each sized about the equivalent of the area of a cylindrical passage having a diameter of 1.52 mm (0.060") then the first stage of the flow restrictor 10 would have a fluid resistance level equivalent to a cylindrical passage having a diameter of about 0.89 mm (0.035"). Using the same cross-sectional areas in the second stage the equivalent passage size for both stages would be lowered to about 0.64 mm (0.025"), and if the third stage is included the equivalent passage size would be lowered further to about 0.51 mm (0.020"). Accordingly, increasingly greater resistance to flow can be achieved by adding more stages to the serpentine fluid flow path.

The fluid director means 12 is preferably manufactured by a precision casting process such as the conventional investment or lost-wax casting process. This can be easily achieved with the constructions illustrated because all of the notches 32, 36, 44, 48, 50, 52 open radially outwardly and simplify the required single pattern. After the casting is made the fluid director means can be centerless ground to the preselected diameter "D" and press-fitted into the bore 56 of the containment member 54. If desired, the external surface 20 of the fluid director means can be furnace brazed to the corresponding internal surface of the containment member for more positive sealing therebetween.

Although three stages are illustrated in FIG. 1, the investment cast fluid director member 16 can be easily separated along the plane B-B. For example, the relatively thicker inner wall 42 can be cut in two to divide the director member into a single stage portion and a double stage portion. Alternately, the third stage can be ground off the other two stages to that separating plane.

The embodiment of FIG. 3 functions in the same way as the embodiment of FIGS. 1 and 2, and is illustrative that the individual stages or fluid director members 16' and 16" can be separately investment cast. Only one pattern is required for the individual stages of the FIG. 3 embodiment if the egress notches 36', 44' and 48' are not cast in place, but rather are subsequently machined in their respective angular positions to cause the fluid to travel counterclockwise within the adjacent stages.

Thus it can be appreciated that the circuitous path flow restrictors 10 and 10' of the present invention are particularly useful for hydraulic control systems requiring a controlled rate of pressure rise to the various motors thereof. They are of simple construction, are easy to manufacture, and can be adapted to varying requirements by merely increasing or decreasing the number of stages thereof. Moreover, the minimum size of the serpentine fluid flow path 58 is large enough that it is unlikely to be plugged by deleterious material.

Other aspects, objects and advantages will become apparent from a study of the specification, drawings and appended claims.

I claim:

1. A circuitous path flow restrictor (10) comprising:
   fluid director means (12) for defining a core (24) having a central axis (18), a plurality of longitudinally oriented fins (26) extending from the core (24) and defining alternately axially offset notches (50,52), and a single longitudinally oriented blocking fin (28) extending from the core (24); and
   body means (14) for encircling the fluid director means (12) and defining an ingress passage (32), an egress passage (36), and a serpentine fluid flow path (58) via the notches (50,52) and in use causing fluid to enter the ingress passage (32) adjacent the blocking fin (28), travel peripherally about the core (24) in the serpentine fluid flow path (58), and exit the egress passage (36) adjacent the opposite side of the blocking fin (28) in a single fluid flow path.

2. The circuitous path flow restrictor (10) of claim 1 wherein the fluid director means (12) includes a first end wall (30) defining with the body means (14) the ingress passage (32) and a second end wall (34) defining with the body means (14) the egress passage (36), the serpentine fluid flow path (58) being disposed between the walls (30,34).

3. The circuitous path flow restrictor (10) of claim 2 wherein the axially offset notches (50,52) and the ingress and egress passages (32,36) each have about the same equivalent cross-sectional area.

4. The circuitous path flow restrictor (10) of claim 3 wherein the body means (14) includes a containment member (54) defining a cylindrical chamber (56) open at one end of the containment member (54), the chamber (56) closely receiving the fluid director means (12).

5. The circuitous path flow restrictor (10) of claim 1 wherein the fluid director means (12) includes a cylindrical wall (30) integrally formed with the core (24), the fins (26), and the blocking fin (28), the ingress passage (32) being formed through the wall (30).

6. The circuitous path flow restrictor (10) of claim 5 wherein the fluid director means (12) includes another cylindrical wall (34) integrally formed with the core (24) and the fins (26,28), the egress passage (36) being formed through the another wall (34), the serpentine fluid flow path (58) being disposed between the walls (30,34).

7. The circuitous path flow restrictor (10) of claim 1 wherein the fluid director means (12) includes a plurality of stages (22,38,40), each stage having a plurality of pie-shaped chambers (59) connected in an annular array by the serpentine fluid flow path (58) and with the individual serpentine fluid flow paths being connected in series.

8. The circuitous path flow restrictor (10) of claim 7 wherein the individual stages (22,38,40) are integrally cast together.

9. A circuitous path flow restrictor (10) comprising:
   a containment member (54) defining a cylindrical chamber (56); and
   a fluid director member (16) closely received in the chamer (56) of the containment member (54) and defining a core (24), a plurality of longitudinally extending notched fins (26) and one longitudinally extending blocking fin (28) extending radially from the core (24), a first wall (30) defining an ingress passage (32), and a second wall (34) defining an egress passage (36), the plurality of notched fins (26) defining axially offset alternate opening means (50,52) therethrough, the containment member (54) and fluid director member (16) being so constructed and arranged that in use fluid enters the ingress passage (32) adjacent the blocking fin (28), travels in a single serpentine fluid flow path (58) peripherally about the core (24) and exits the egress passage (36) adjacent the opposite side of the blocking fin (28).

10. The circuitous path flow restrictor (10) of claim 9 wherein the fluid director means (12) has a plurality of stages (22,38,40), the serpentine fluid flow path (58) of each stage being connected in series.

11. The circuitous path flow restrictor (10) of claim 9 wherein the fins (26) and the blocking fin (28) define a plurality of pie-shaped chambers (59) in an annular array.

12. The circuitous path flow restrictor (10) of claim 9 wherein the ingress passage (32), the egress passage (36), and the alternate opening means (50,52) open radially outwardly on the containment member (54) within the cylindrical chamber (56).

* * * * *